United States Patent
Deiseroth et al.

(10) Patent No.: US 12,147,468 B2
(45) Date of Patent: Nov. 19, 2024

(54) ON-DEMAND VARIABLE FEATURE EXTRACTION IN DATABASE ENVIRONMENTS

(71) Applicant: SAP SE, Walldorf (DE)

(72) Inventors: Bjoern Deiseroth, Darmstadt (DE); Frank Gottfried, Walldorf (DE)

(73) Assignee: SAP SE, Walldorf (DE)

( * ) Notice: Subject to any disclaimer, the term of this patent is extended or adjusted under 35 U.S.C. 154(b) by 704 days.

(21) Appl. No.: 16/219,320

(22) Filed: Dec. 13, 2018

(65) Prior Publication Data

US 2020/0192932 A1 Jun. 18, 2020

(51) Int. Cl.
| | |
|---|---|
| G06F 16/51 | (2019.01) |
| G06F 16/532 | (2019.01) |
| G06F 16/587 | (2019.01) |
| G06V 10/34 | (2022.01) |
| G06V 10/46 | (2022.01) |

(52) U.S. Cl.
CPC ............ *G06F 16/51* (2019.01); *G06F 16/532* (2019.01); *G06F 16/587* (2019.01); *G06V 10/34* (2022.01); *G06V 10/46* (2022.01)

(58) Field of Classification Search
CPC ...... G06F 16/532; G06F 16/587; G06F 16/51; G06T 9/00; G06K 9/481
USPC ...................................................... 707/769
See application file for complete search history.

(56) References Cited

U.S. PATENT DOCUMENTS

| | | | | |
|---|---|---|---|---|
| 5,129,011 A * | 7/1992 | Nishikawa | ........... | H04N 1/2175 382/233 |
| 5,621,827 A * | 4/1997 | Uchiyama | ............... | G06T 17/20 382/190 |
| 6,711,287 B1 * | 3/2004 | Iwasaki | ................ | G06K 9/4652 382/165 |
| 7,986,344 B1 * | 7/2011 | Ishii | .................... | H04N 1/00204 348/211.3 |
| 8,798,401 B1 * | 8/2014 | Johnson | ............... | G06V 40/172 382/305 |

(Continued)

FOREIGN PATENT DOCUMENTS

| | | | | |
|---|---|---|---|---|
| CA | 2472891 A1 * | 12/2005 | ............... | G06K 9/48 |
| CN | 106354735 A * | 1/2017 | ............. | G06F 16/00 |

(Continued)

OTHER PUBLICATIONS

Regmi, Ashim. Image compression using deep autoencoder. Diss. Ph. D. thesis, Tribhuvan University, 2016. (Year: 2016).*

(Continued)

*Primary Examiner* — Tony Mahmoudi
*Assistant Examiner* — Hubert Cheung
(74) *Attorney, Agent, or Firm* — Mintz Levin Cohn Ferris Glovsky and Popeo, P.C.

(57) ABSTRACT

A method, a system, and a computer program product for performing on-demand feature extraction from a raw image of an object for analysis. A query is executed to retrieve an image of an object. Using one or more parameters of the query, a raw image of the object is compressed to generate a compressed image of the object. One or more features associated with the object are extracted from the compressed image of the object. Based on the compressed image of the object, the image of the object is generated using the extracted one or more features of the object.

11 Claims, 9 Drawing Sheets

(56) References Cited

U.S. PATENT DOCUMENTS

| | | | | |
|---|---|---|---|---|
| 8,898,139 | B1* | 11/2014 | Philbin | G06F 16/583 |
| | | | | 707/711 |
| 9,875,552 | B1* | 1/2018 | Savage | G06T 7/246 |
| 10,311,334 | B1* | 6/2019 | Florez Choque | G06V 10/7747 |
| 2003/0194134 | A1* | 10/2003 | Wenzel | G06V 10/752 |
| | | | | 382/209 |
| 2003/0206171 | A1* | 11/2003 | Kim | G06V 40/162 |
| | | | | 345/473 |
| 2006/0008151 | A1* | 1/2006 | Lin | G06V 10/46 |
| | | | | 382/190 |
| 2007/0195089 | A1* | 8/2007 | Furukado | G06T 7/73 |
| | | | | 345/426 |
| 2008/0034340 | A1* | 2/2008 | Uchida | G06F 30/394 |
| | | | | 716/126 |
| 2010/0082630 | A1* | 4/2010 | Zagelow | G06F 16/2272 |
| | | | | 707/741 |
| 2013/0232168 | A1* | 9/2013 | McGregor | G06F 16/29 |
| | | | | 707/769 |
| 2014/0241634 | A1* | 8/2014 | Dhua | G06V 10/46 |
| | | | | 382/194 |
| 2014/0294232 | A1* | 10/2014 | Ju | G06T 5/50 |
| | | | | 382/103 |
| 2015/0234862 | A1* | 8/2015 | Patil | G06F 16/951 |
| | | | | 707/706 |
| 2015/0356373 | A1* | 12/2015 | Marchisio | H04N 1/4074 |
| | | | | 382/191 |
| 2016/0203194 | A1* | 7/2016 | Park | G06T 11/60 |
| | | | | 707/722 |
| 2016/0217607 | A1* | 7/2016 | Hendrey | G06T 15/30 |
| 2016/0358024 | A1* | 12/2016 | Krishnakumar | G06V 10/82 |
| 2017/0180730 | A1* | 6/2017 | Yatabe | H04N 19/61 |
| 2017/0185670 | A1* | 6/2017 | Dua | G06F 16/334 |
| 2017/0293800 | A1* | 10/2017 | Babenko | G06K 9/4628 |
| 2018/0060691 | A1* | 3/2018 | Bernal | G06K 9/6256 |
| 2018/0063538 | A1* | 3/2018 | Bernal | H04N 19/103 |
| 2018/0075345 | A1* | 3/2018 | Gottfried | G06N 3/049 |
| 2018/0157937 | A1* | 6/2018 | Kang | G06V 30/19173 |
| 2018/0336452 | A1* | 11/2018 | Tschernezki | G06N 3/0454 |
| 2018/0336460 | A1* | 11/2018 | Tschemezki | G06N 3/0445 |
| 2019/0050625 | A1* | 2/2019 | Reinstein | G06K 9/4633 |
| 2019/0073594 | A1* | 3/2019 | Eriksson | G06F 18/23 |
| 2019/0108631 | A1* | 4/2019 | Riley | G06T 7/0004 |
| 2019/0147305 | A1* | 5/2019 | Lu | G06F 18/2413 |
| | | | | 382/157 |
| 2019/0171908 | A1* | 6/2019 | Salavon | G06V 10/82 |
| 2019/0205331 | A1* | 7/2019 | Cevahir | G06N 3/088 |
| 2020/0012761 | A1* | 1/2020 | El-Baz | G16B 40/20 |
| 2020/0082531 | A1* | 3/2020 | de Vaan | G06T 7/0012 |
| 2020/0104940 | A1* | 4/2020 | Krishnan | G06N 3/04 |
| 2020/0151538 | A1* | 5/2020 | Sha | G06V 10/774 |
| 2020/0244997 | A1* | 7/2020 | Galpin | G06T 9/002 |

FOREIGN PATENT DOCUMENTS

| | | | | |
|---|---|---|---|---|
| CN | 106951467 A | * | 7/2017 | |
| CN | 108153756 A | * | 6/2018 | |
| CN | 108846422 B | * | 8/2021 | G06K 9/6256 |
| JP | 2006350756 A | * | 12/2006 | |
| JP | 2015012482 A | * | 1/2015 | H04N 5/23232 |
| WO | WO-2008134901 A1 | * | 11/2008 | G06F 16/50 |
| WO | WO-2017208371 A1 | * | 12/2017 | G06F 16/00 |

OTHER PUBLICATIONS

Y. Yang, Q. M. J. Wu and Y. Wang, "Autoencoder With Invertible Functions for Dimension Reduction and Image Reconstruction," in IEEE Transactions on Systems, Man, and Cybernetics: Systems, vol. 48, No. 7, pp. 1065-1079, Jul. 2018, doi: 10.1109/TSMC.2016. 2637279. (Year: 2018).*

G. Xu and W. Fang, "Shape retrieval using deep autoencoder learning representation," 2016 13th International Computer Conference on Wavelet Active Media Technology and Information Processing (ICCWAMTIP), Chengdu, China, 2016, pp. 227-230, doi: 10.1109/ICCWAMTIP.2016.8079843. (Year: 2016).*

* cited by examiner

ON-DEMAND VARIABLE FEATURE EXTRACTION IN DATABASE ENVIRONMENTS

TECHNICAL FIELD

This disclosure relates generally to data processing and, in particular, to on-demand computation of variable feature extraction in database systems.

BACKGROUND

Data (e.g., raster data, raw raster data, images, etc.) relating to various geographical locations is typically obtained using satellites, airplanes, drones, and other devices capable of photographing from a particular point. Such devices are equipped with cameras, camcorders, sensors, etc. capable of obtaining raw image data. The raw image data is used to perform analysis of various aspects of geographical locations. These can include tree genera analysis, vegetation growth, structure analysis, etc. The raw image data has a multitude of images that may have been taken at successive intervals that may reveal various changes to the objects being photographed. Each image may be a static representation of such objects and is stored in a memory location. The images may be cataloged using various parameters, such as, location, time at which the image was taken, type of object being photographed, type of device being used to obtained the image, etc.

SUMMARY

In some implementations, the current subject matter relates to a computer-implemented method for performing on-demand feature extraction from a raw image of an object for analysis. The method may include executing a query to retrieve an image of an object, compressing, using one or more parameters of the query, a raw image of the object to generate a compressed image of the object, extracting the one or more features associated with the object from the compressed image of the object, and generating, based on the compressed image of the object, the image of the object using the extracted one or more features of the object.

In some implementations, the current subject matter may include one or more of the following optional features. The query may specify at least one of: a geographical location of the object and a time period during which an image of the object was obtained (as discussed above, features/index description, e.g., risk of wildfires, etc., may be specified/determined).

In some implementations, the method may further include combining the generated image of the object with an additional data associated with the object, and generating a combined representation of the object including the generated image of the object and the additional data. The compressing may include encoding the raw image to generate one or more encoded values corresponding to the one or more features of the object, decoding the encoded raw image to generate one or more indexes, and generating, using the one or more indexes, one or more polygons to represent a boundary of the object. In some implementations, object's image generation may include reconstructing the image of the object using the one or more generated polygons.

In some implementations, the method may also include storing the indexes in an index table in a database system.

The method may also include receiving another raw image of the object, and updating the index table based on the received another raw image.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

Satellite imagery, Earth observation image data, drone image data, and other image data of various geographical locations, also referred to as, raw imagery, is typically very large and may be difficult to analyze. Raw imagery may have little value and may need to be processed further to extract more relevant information, such as spectral indexes, land cover/usage classification/change detection data, industry indexes, and/or customer indexes. Size of raw imagery may reach into petabyte territory and hence, may become non-consumable by databases, may exceed data volume limits, may require significant compute resources to pre-compute one or all of the above indexes, which may not be feasible. Querying raw image data to obtain relevant information may be different (e.g., in particular the dimensions may be restricted, a particular user may only be interested in a particular geographic area/time-area/index-area at a time), and thus, there is a need for an efficient system for extraction of relevant features from raw imagery.

To address these and potentially other deficiencies of currently available solutions, one or more implementations of the current subject matter relate to methods, systems, articles of manufacture, and the like that may, in some implementations, provide an ability to perform feature extraction in database system on demand.

In some implementations, the current subject matter may provide an ability to process data (e.g., image data, raster data, which will be used interchangeably herein), and, in particular, satellite imagery, geospatial image data, Earth observation data, raster data, etc., and retrieve various data (e.g., consumable/joinable data by a database system) relating to specific objects contained in the image data without processing full images. Specifically, the current subject matter is capable of storing compressed raster data, including metadata related to the image, generate queries to such stored compressed data (e.g., raster data), retrieve data sought by the queries, and reconstruct images, directly extract information from compressed data, and/or use multiple compressions to generate different user-specific indexes, which can be machine learning-based, based on the retrieved compressed data.

The current subject matter may be useful in a variety of scenarios, including ascertaining location, values, etc. of objects in different environments, such as, for example, determining insurance values of object in natural disaster prone areas (e.g., areas with risks of wildfires, floods, earthquakes, storms, etc.). A query may be generated and executed on a database that stores various data (e.g., image data, raster data, satellite image data, earth observation data, etc.) in a compressed format. The data may be stored in a tabular format and may be cross-correlated with other information (e.g., monetary values of objects, proximity to other structures, objects, etc.). Using the query, the data relating to objects of interest may be retrieved as well as the compressed imaged data may be reconstructed to allow analysis of the imagery and data.

The data may be obtained from Earth observation data, satellite, drone, airplane, etc. raster data. By way of a non-limiting example, a sample query (e.g., SQL query) seeking to obtain raster data (stored in a compressed form in a database) on insured objects in a particular area (e.g., Europe) that may be prone to a wildfire risk (e.g., where a wildfire risk factor is greater than 0.8% and may be an on-demand generated index given a particular fixed area and date) may include:

"SELECT my-insured-objects FROM customers-in-europe WHERE wildfire_risk/flood/ . . . >0.8% AND date=now"

Similarly, a query seeking on-demand information of a particular state of vegetation in a specific area (Asia) (e.g., palm-tree-likelihood prediction based on a particular imagery/compressed data) may include the following statement:

"SELECT objects FROM asia WHERE palm-tree-likelihood >0.8% AND date=now"

In some implementations, the current subject matter may provide a processing system that may include a database structure storing various images information, including image indices, corresponding geolocation, time limit information, etc., that may be easily queried by a user (e.g., using the above queries) and retrieved. The retrieved information may be aggregated and/or joined with any other information. In the above exemplary queries, the information returned by the queries may include image polygons corresponding to locations/objects having a wildfire risk>x (as in the first query) and a list of geo-located objects (as in the second query). The exemplary database structure may include an index table that may be updated (e.g., automatically, periodically, manually, etc.) with any available data for all image sources (e.g., satellites, including for example, geo-bounding box(es), recording-time(s), satellite-type(s), cloud-shared-storage-path(s), compressions, encodings, etc.). The queries may be configured to retrieve the desired data by, for example, selection of specific areas, objects, subject matter, user indexes, user computations, times, etc. The returned data (e.g., polygons representative of actual images) may be returned and then joined with any other data that may be sought by the user issuing the query. As stated above, the images may be stored in a compressed format. For example, the processing structure may include a middle layer of auto-encoders (or any other type of artificial neural networks algorithms), which may compress image data (e.g., with loss) using various parameters (e.g., on a particular weather dataset by a factor 2000). Such compression reduces raw images dimensions and, hence, consumption of computational resources in a particular storage location while ensuring that the produced polygons are simplified (as may be requested/required by a user). The generated encodings may be combined with other encodings to directly generate contours (e.g., polygons) that may be used as an index that is not directly related/extractable by the raw image data.

Figure 1:
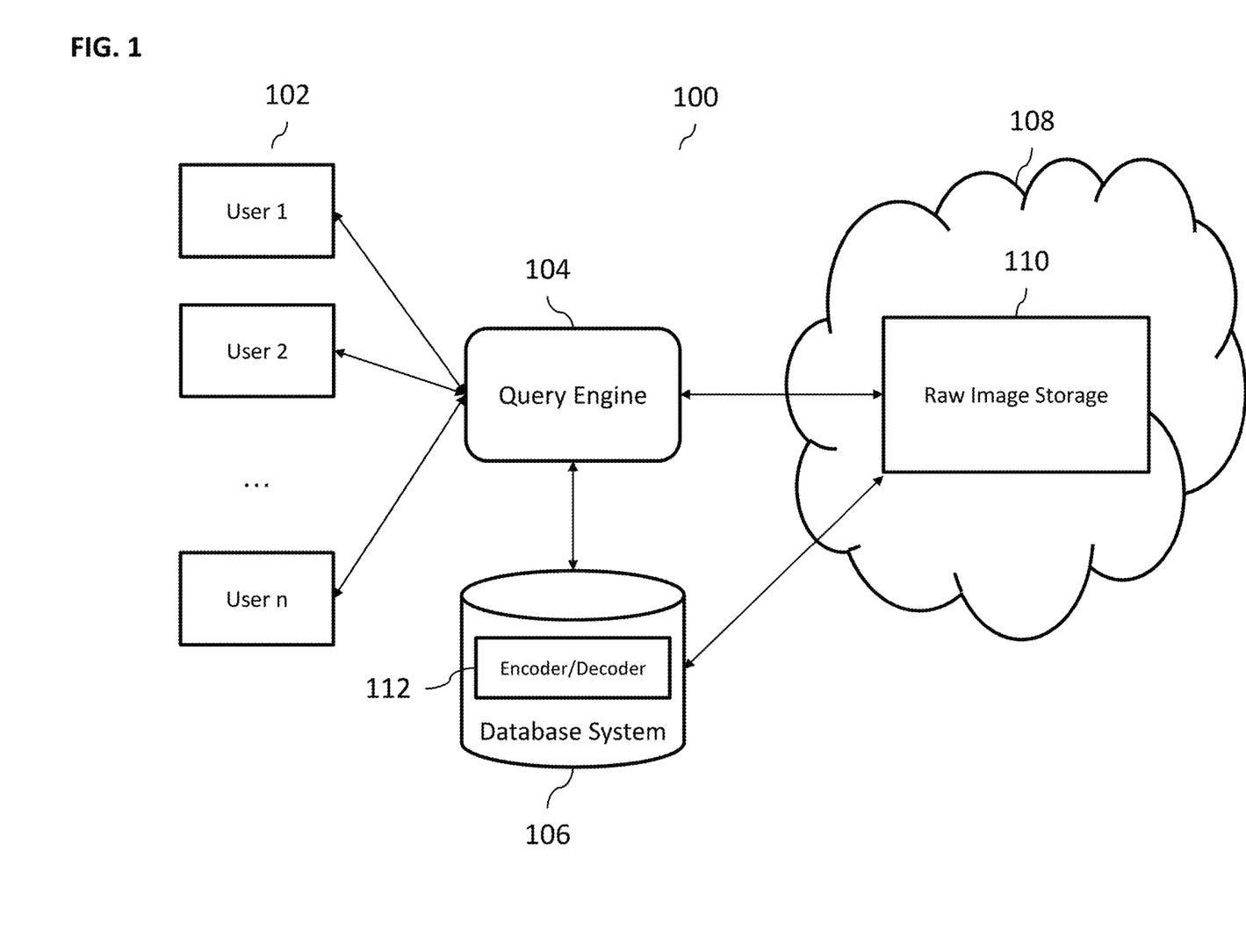
FIG. 1 illustrates an exemplary system for processing of queries to obtain raster data, according to some implementations of the current subject matter.

FIG. 1 illustrates an exemplary system 100 for processing of queries to obtain raster data, according to some implementations of the current subject matter. The system 100 may include one or more users (user 1, user 2, . . . user n) 102, a query engine 104, a database system 106, a cloud storage 108 that may include a raw image storage 110. The users 102, the query engine 104, the database system 106, the cloud storage 108, and the raw image storage 110 may be communicatively coupled with one another using any type of network, including but not limited to, wired, wireless, and/or a combination of both. The users 102 may include at least one of the following: computer processors, computing networks, software applications, servers, user interfaces, and/or any combination of hardware and/or software components. Database system 106 may include at least one of the following: databases, storage locations, memory locations, and/or any combination of hardware and/or software components. In some implementations, the database system 106 may be a High Performance Analytic Appliance ("HANA") system as developed by SAP SE, Walldorf, Germany, as will be described below.

The query engine 104 may include any combination of software and/or hardware components and may be configured to receive and execute a query from one or more users 102 to obtain data from the database system 106. Execution of a query may typically require generation of a query plan or query execution plan, which may be an ordered set of operations that may be used to access stored data (e.g., access data in a SQL relational database management system). Upon submission of a query to the database system 106, requested data may be retrieved based on parameters of the query. The retrieved data may be aggregated/joined with any other data that may be sought by the user. In some implementations, the query engine 104 and/or the database system 106 may be configured to access the raw image storage 110 in the cloud storage 108 to obtain image information (additional processing may be performed, including encoding on INSERT statements and/or decoding on SELECT statements), such as, for the purposes of generating an encoded version of the image and obtaining geolocation and time information (i.e., the time when a particular raw image was generated).

The raw image storage 110 may be configured to store raw imagery obtained by various image sources, such as, for example, but not limited to, satellites, drones, airplanes, aerial surveillance devices, etc. The images may include still images, videos, and/or any other graphical data, and/or any combination thereof. The raw image storage 110 may also store location coordinates associated with a particular image as well as date and/or time when a particular raw image was obtained (and/or further processed).

In some implementations, the database system 106 may include one or more encoders/decoders 112. The encoders/decoders 112 may perform encoding of raw images (i.e., reduction of their dimensionalities) that may be obtained from the raw image storage to reduce an amount of data that is stored by the database system 106. The encoders/decoders 112 may also assist during reconstruction of an image based on the encoded version of the image. The encoders/decoders 112 may be any type of mechanisms that may be configured to perform encoding of raw images using artificial neural networks, including, for example, auto-encoders (which learn a representation (encoding) for a set of data to reduce its dimension). In particular, an auto-encoder compresses data from the input layer into a short code, and then un-compresses that code into something that closely matches the original data, thereby reducing the data's (i.e., the raw image) dimensions. In reducing the raw image's dimensions, the auto-encoder may learn to ignore noise, to encode easy features like corners, then to analyze the first layer's output and encode less local features, such as smaller details of a portion of an image, and then encode the entire portion until the entire image is encoded into a code that matches the original. In some exemplary implementations, encoders/decoders (in part, or whole) may be executed in a cloud system, as opposed to at a server and/or a database level. Encoders/decoders may not just encode/decode the original image but directly perform an extraction and/or combine different encoded data directly to extract some "db-consumable" and/or other "abstract features". Some examples of encoders/decoders may include Neuralnet-Autoencoders, Statistics-Restricted Bolzmann machines (that store just their hidden values and reconstruct probabilities), Loss-less and/or full compressions such as png/jpg/lzw/zip/ etc., direct deterministic and/or numerically approximations of Principle Component Analysis related algorithms, and/or any other types of encoders/decoders.

Figure 2:
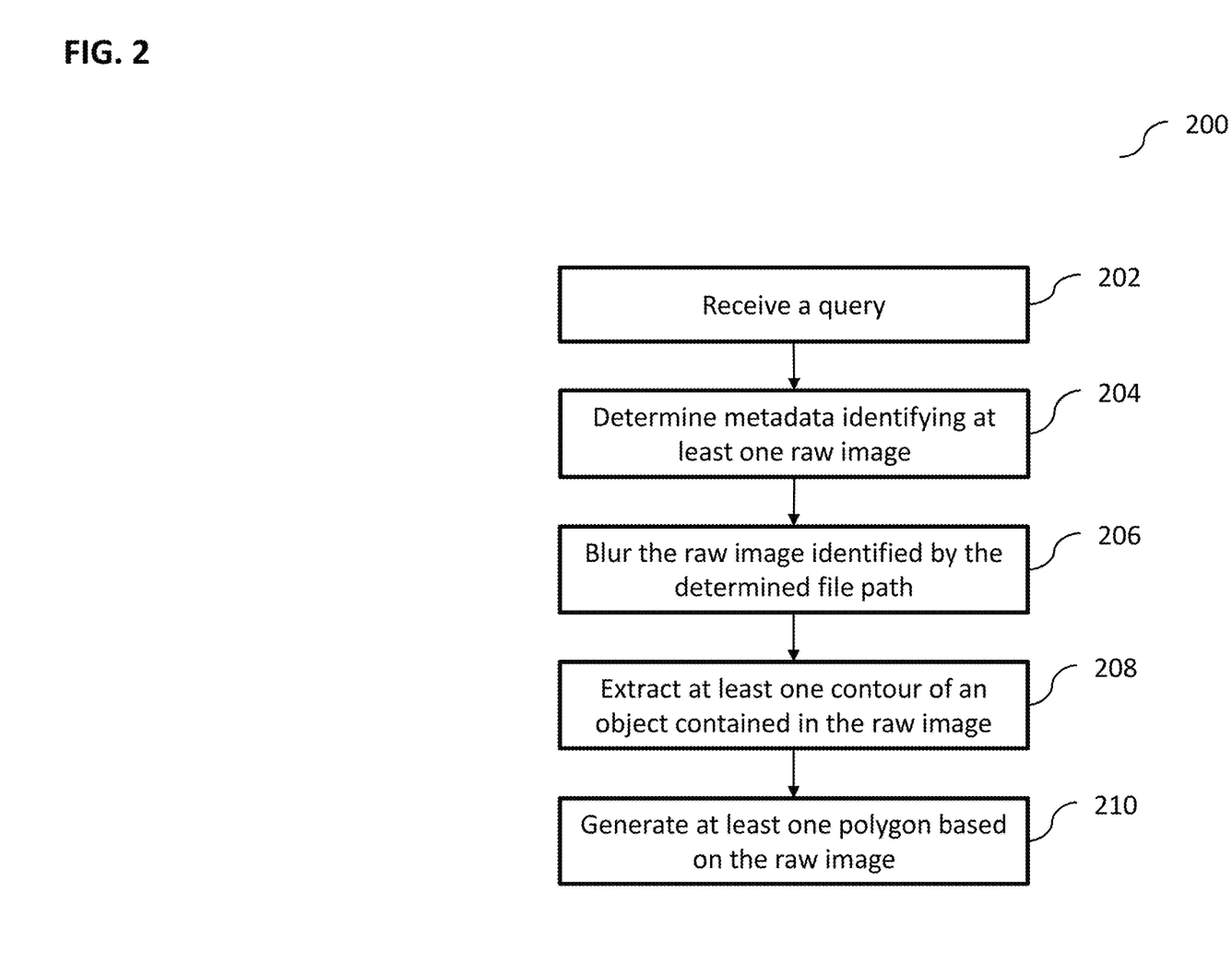
FIG. 2 illustrates an exemplary process for extracting vector data from raster data, according to some implementations of the current subject matter.

FIG. 2 illustrates an exemplary process 200 for querying raster data, according to some implementations of the current subject matter. At 202, a query may be received. The query may be configured to seek data raster data that may be related to a specific analysis that the user would like to perform. For example, the raster data sought may be related to a risk of wildfires at a particular geographical location to a particular time range for the purposes of determining whether such risk is exceeding a particular threshold. The query may be generated by the user 102 (as shown in FIG. 1) and executed by the query processing engine 104. The query may include various parameters that may identify the data being sought (e.g., specific area of interest, identify date/time range, featured indices etc.).

Figure 3:
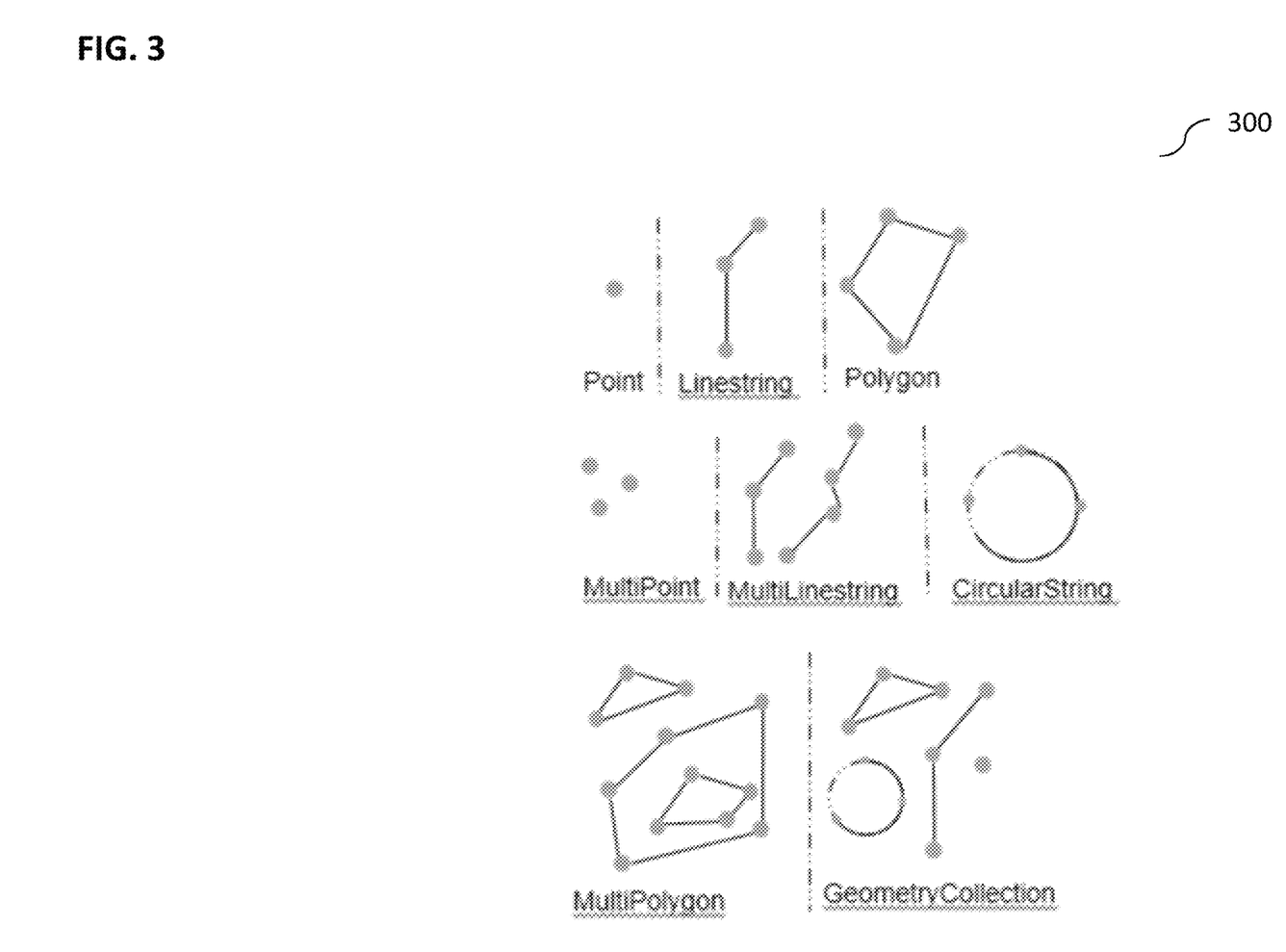
FIG. 3 illustrates exemplary spatial datatypes.

At 204, system 100 may determine metadata that identifies image data stored in the raw image storage 110 that is being sought by the query. The query may include dimension based parameters, including for example, date, location, feature(s) that are desired, etc. The desired raster-feature may then be determined (e.g., computed) from the necessary raw-raster. The computation may be performed on demand and may or may not be cached for further determinations. As raster data cannot be used in databases, it may be converted into a consumable format, e.g., vector-data (e.g., a contour extraction to a particular threshold). For this process, some detail may be omitted (e.g., a worst-case analysis may be performed), so that the image may be blurred before polygon extraction. The polygon(s) may be used to perform JOIN of the query. The metadata may include a file path. Then the raw image identified by the metadata may be blurred, at 206. At 208, a contour of one or more features may be extracted from the blurred imagery. One or more vector data (e.g., polygons) may be generated based on the contours, at 210. The generated vector data (e.g., polygons) may be processed by the database system 106 (e.g., in a distributed fashion in accordance with the location of the raw data). Exemplary geo-spatial types/vector data 300 (e.g., point, line-string, polygon, multi-point, multi-line-string, circular-string, multi-polygon, geometry-collection, etc.) are illustrated in FIG. 3. The generated vector data may be representative of various features of raw images. After importing the extracted features, the db-native datatypes, e.g., vectors, may be used to perform JOINs of the vector data with various other data sets, and/or any other operations.

In some implementations, the system 100 may generate vector data corresponding to features of a particular image by encoding raw image data. Encoding may be performed using any encoding/decoding mechanism that implements neural networks (or any other methodology), including but not limited to, an autoencoder.

Figure 4:
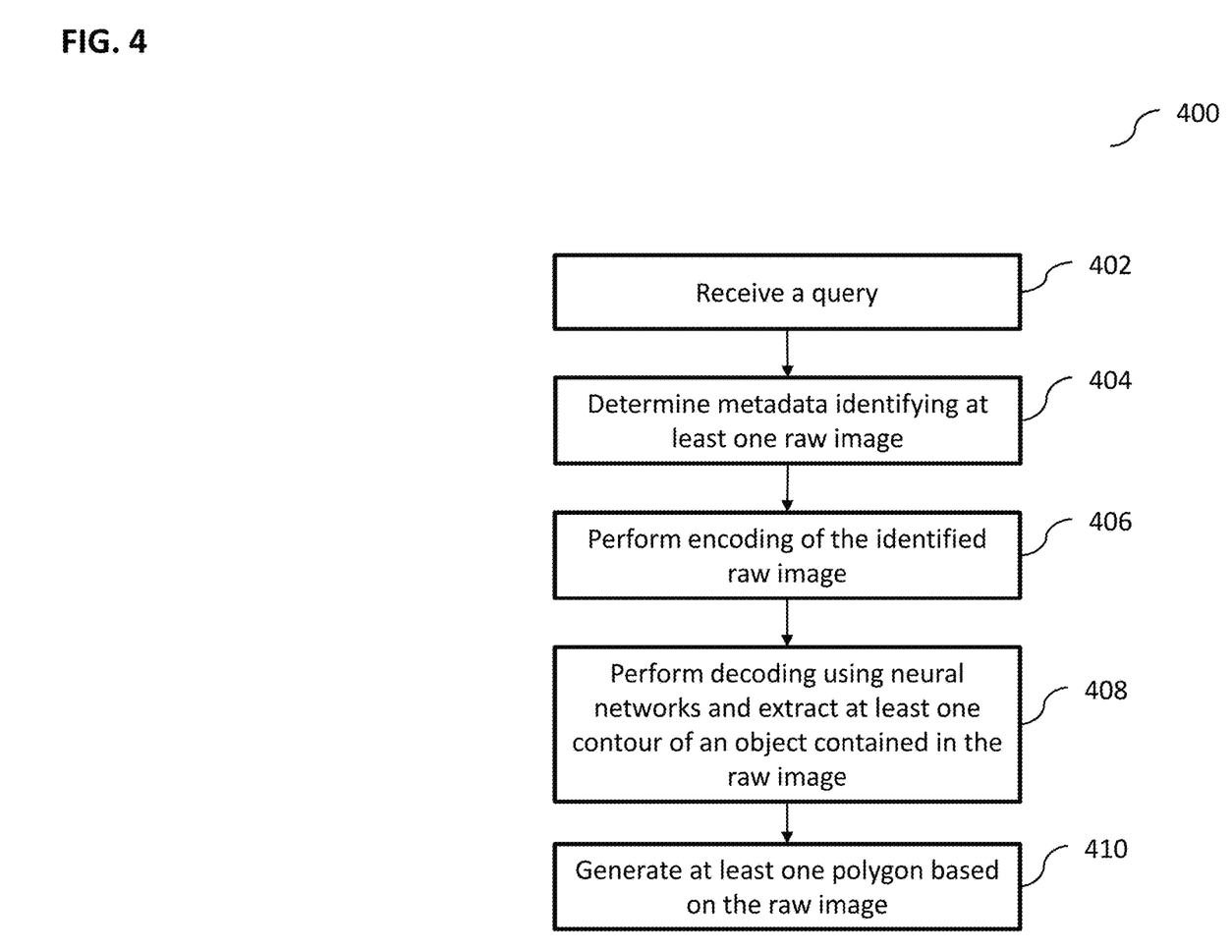
FIG. 4 illustrates an exemplary process for generating polygons from a raw image data, according to some implementations of the current subject matter.

FIG. 4 illustrates an exemplary process 400 for generating polygons of a raw image data, according to some implementations of the current subject matter. At 402, a query may be received, where the query may be used to identify metadata of a raw image stored in the storage 110, at 404. The metadata can be a file path and/or any other information that may allow processing of raw imagery. At 406, an encoding of the identified raw image can be performed.

Figure 5:
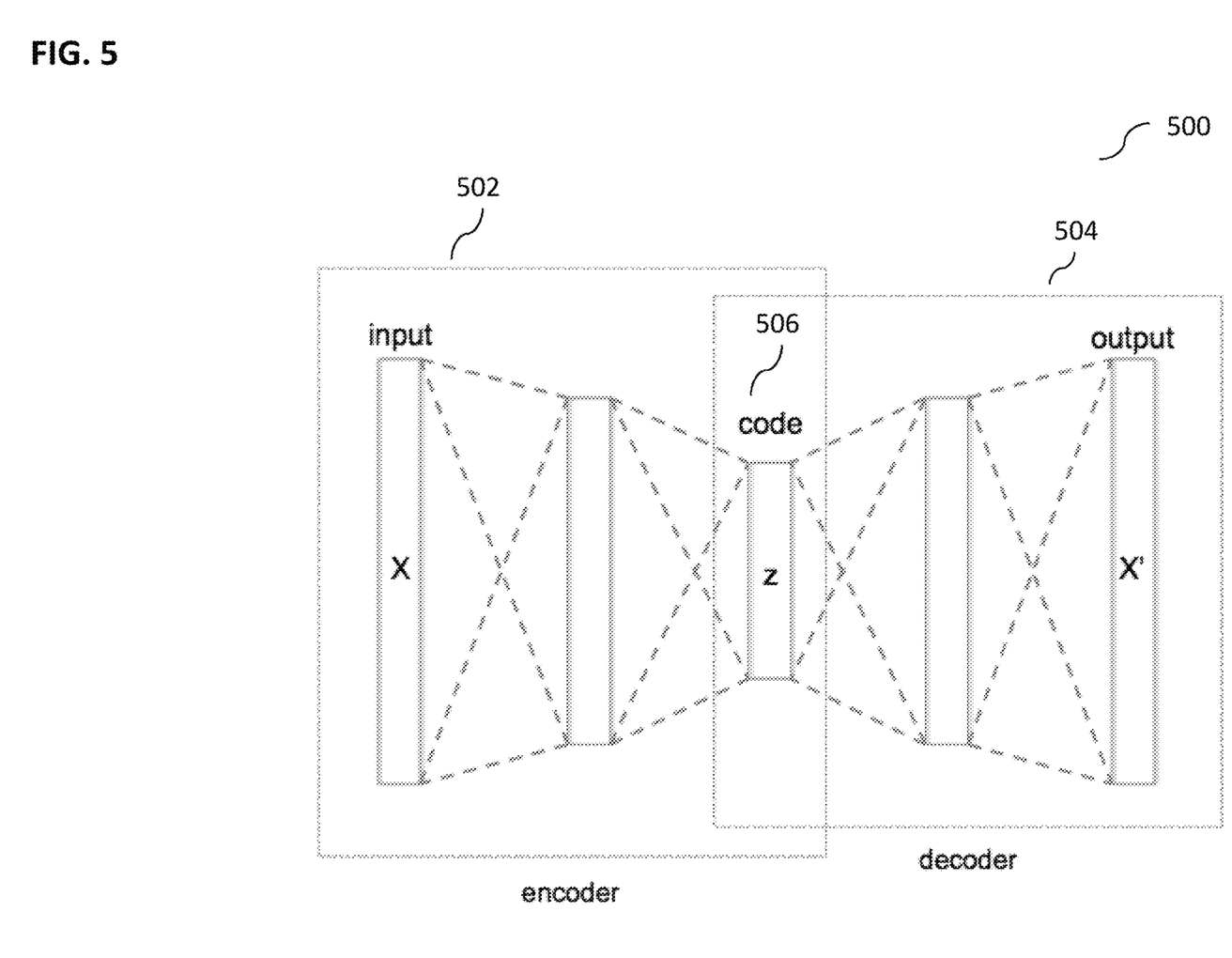
FIG. 5 illustrates an exemplary autoencoder.

FIG. 5 illustrates an exemplary autoencoder 500. The autoencoder is an unsupervised learning model and includes an input layer 502, an output layer 504, and a hidden layer 506 that connects the input and output layers. The output layer 504 has the same number of nodes as the input layer 502. An autoencoder may be trained using different variations of backpropagation (e.g., conjugate gradient method, steepest descent, etc.). In some case, pretraining of autoencoders may be performed. The autoencoder 500 may be used to approximate raw input data, where the small hidden or intermediate layer 506 is stored in the database system 106. The stored encoded values in a database (db) may be used and/or combined with other values of these and/or other computations. A similarity match may be performed on compressed data generated by autoencoders, for example, a similar clusters for a predetermined time/date-range(s) and/ or geo-location(s) for a particular feature may be identified.

Referring back to FIG. 4, at 406, the autoencoder 500, in the output layer 506 of the encoding part 502, may perform encoding of the raw image data using neural networks and extract features that may be representative for later desired contour extraction of features contained in the raw image data and stored in the database system 106. At 408, features and/or polygons may be generated by the system 100. For this, stored encoded codes 506 may be used as input for the decoder part 504 of the auto-encoder 500, to reconstruct and approximate raw image data or desired feature as needed, and further post-process extract the contour line to the particular threshold (contained objects).

In some exemplary implementations, each feature may include one or more encoded values (e.g., 16 encoded values) indicative of the raw image data. One or more indexes may be generated based on the encoded values. The indexes can be used to train models, which in turn, can be used to generate scores relating to one or more object features. In some implementations, the values in the features may generate one or more indexes, one or more of which can be used for training purposes and/or may be combined to generate one or more scores. The indexes may be generated based on different source data, and then, may be combined for training purposes. Further, multiple decoders may be trained using one or more indexes or further processed feature data.

At 410, the output of the decoder portion of the autoencoder 500 may be used to generate vector data or polygons. The generated polygons may be combined with other data for output to the user. For example, the generated polygons along with specific geolocation information, e.g., coordinates of objects subject to a wildfire risk, etc., and a time interval data, e.g., when raw images were obtained, and/or any desired time interval, etc., may be combined and/or cross-correlated with any other data, e.g., replacement value of objects data, to produce a desired correlation. The output may also include reconstructed image data that may be produced as using the indexes from the raw image data. Further, this output data may be compressed and transmitted to database system 106 in a native database binary data types (e.g., polygons). It may be used within the database system natively in further processing operations.

The generated indexes may be included in a table that may be stored in the database system 106. The table may be updated automatically, periodically, and/or manually. Updates may occur upon processing of further raw image data stored in the raw image storage 108, acquisition of new raw image data through various sources, deletion of raw image data, and/or any other modification of existing data.

In some implementations, the system 100 may process several queries in parallel (alternatively, for example, a single SELECT query may trigger multiple executions in parallel, whereby results may be aggregated later on), which may allow users to obtain information on multiple objects at substantially the same time. Multiple raw images may be processed in parallel generating sets of features and indexes that may be used in responding to user queries. The query parameters may limit the scope of processing that may be performed by the system 100. For example, specific geographical location, time interval, as well as various thresholds to specific features (e.g., risk of wildfire >certain threshold) may reduce the number of raw images that may need to be processed in parallel.

In some implementations, the current subject matter may be implemented in various in-memory database systems, such as a High Performance Analytic Appliance ("HANA") system as developed by SAP SE, Walldorf, Germany. Various systems, such as, enterprise resource planning ("ERP") system, supply chain management system ("SCM") system, supplier relationship management ("SRM") system, customer relationship management ("CRM") system, and/or others, may interact with the in-memory system for the purposes of accessing data, for example. Other systems and/or combinations of systems may be used for implementations of the current subject matter. The following is a discussion of an exemplary in-memory system.

Figure 6:
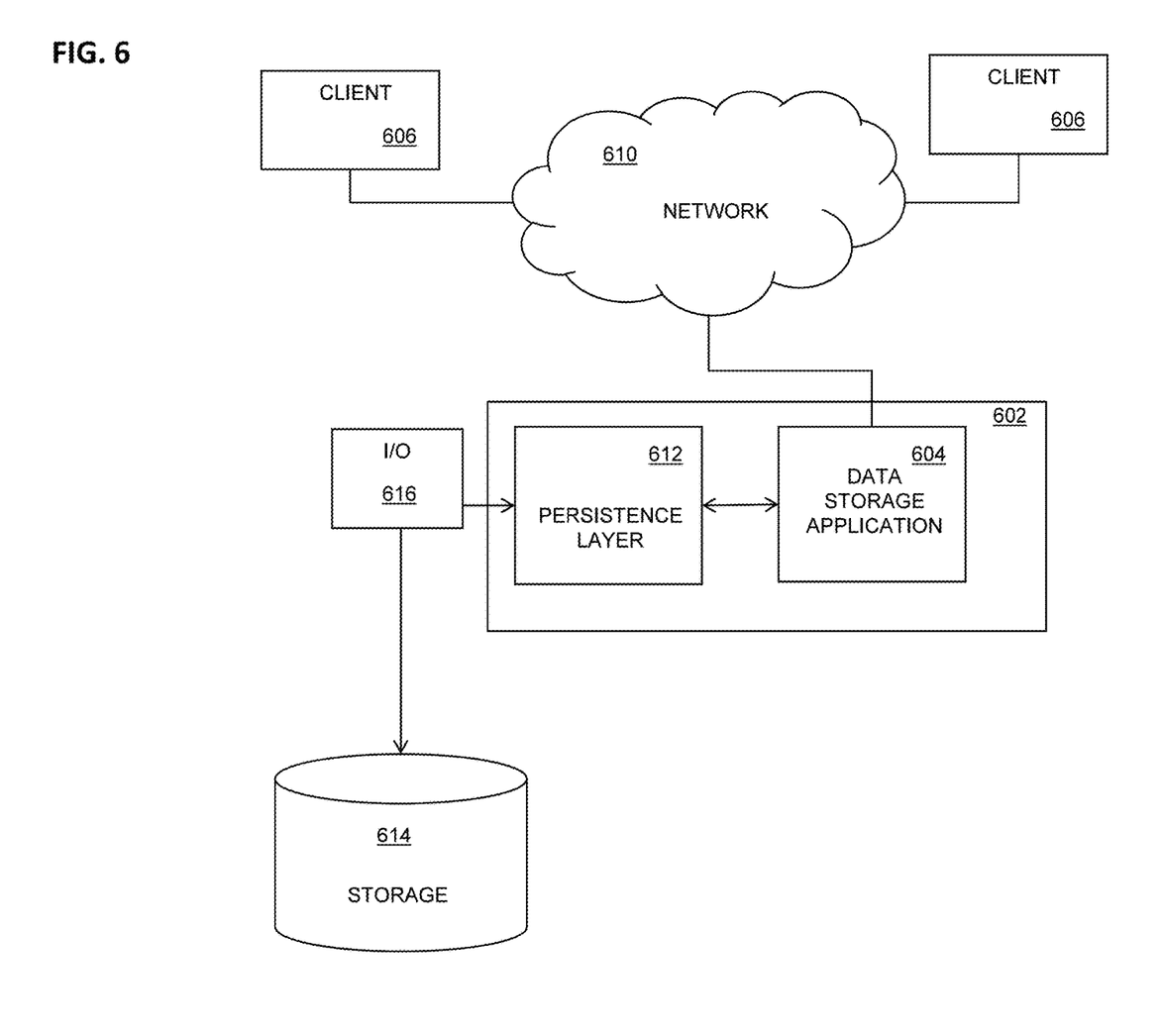
FIG. 6 is a diagram illustrating an exemplary system including a data storage application, according to some implementations of the current subject matter.

FIG. 6 illustrates an exemplary system 600 in which a computing system 602, which may include one or more programmable processors that may be collocated, linked over one or more networks, etc., executes one or more modules, software components, or the like of a data storage application 604, according to some implementations of the current subject matter. The data storage application 604 may include one or more of a database, an enterprise resource program, a distributed storage system (e.g. NetApp Filer available from NetApp of Sunnyvale, CA), or the like.

The one or more modules, software components, or the like may be accessible to local users of the computing system 602 as well as to remote users accessing the computing system 602 from one or more client machines 606 over a network connection 610. One or more user interface screens produced by the one or more first modules may be displayed to a user, either via a local display or via a display associated with one of the client machines 606. Data units of the data storage application 604 may be transiently stored in a persistence layer 612 (e.g., a page buffer or other type of temporary persistency layer), which may write the data, in the form of storage pages, to one or more storages 614, for example via an input/output component 616. The one or more storages 614 may include one or more physical storage media or devices (e.g. hard disk drives, persistent flash memory, random access memory, optical media, magnetic media, and the like) configured for writing data for longer term storage. It should be noted that the storage 614 and the input/output component 616 may be included in the computing system 602 despite their being shown as external to the computing system 602 in FIG. 6.

Data retained at the longer term storage 614 may be organized in pages, each of which has allocated to it a defined amount of storage space. In some implementations, the amount of storage space allocated to each page may be constant and fixed. However, other implementations in which the amount of storage space allocated to each page may vary are also within the scope of the current subject matter.

Figure 7:
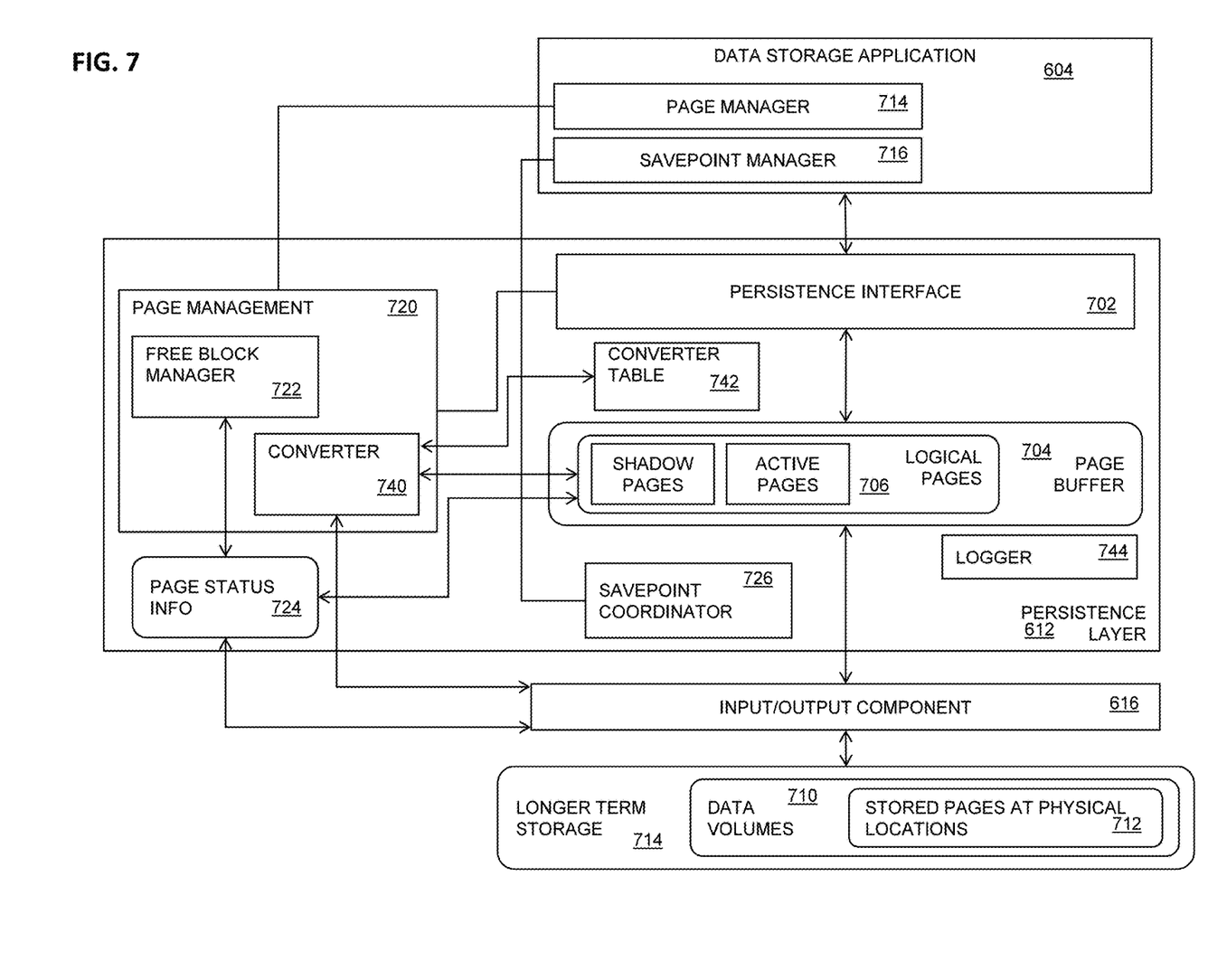
FIG. 7 is a diagram illustrating details of the system of FIG. 6.

FIG. 7 illustrates exemplary software architecture 700, according to some implementations of the current subject matter. A data storage application 604, which may be implemented in one or more of hardware and software, may include one or more of a database application, a network-attached storage system, or the like. According to at least some implementations of the current subject matter, such a data storage application 604 may include or otherwise interface with a persistence layer 612 or other type of memory buffer, for example via a persistence interface 702. A page buffer 704 within the persistence layer 612 may store one or more logical pages 706, and optionally may include shadow pages, active pages, and the like. The logical pages 706 retained in the persistence layer 612 may be written to a storage (e.g. a longer term storage, etc.) 614 via an input/output component 616, which may be a software module, a sub-system implemented in one or more of software and hardware, or the like. The storage 614 may include one or more data volumes 710 where stored pages 712 are allocated at physical memory blocks.

In some implementations, the data storage application 604 may include or be otherwise in communication with a page manager 714 and/or a savepoint manager 716. The page manager 714 may communicate with a page management module 720 at the persistence layer 612 that may include a free block manager 722 that monitors page status information 724, for example the status of physical pages within the storage 614 and logical pages in the persistence layer 612 (and optionally in the page buffer 704). The savepoint manager 716 may communicate with a savepoint coordinator 726 at the persistence layer 612 to handle savepoints, which are used to create a consistent persistent state of the database for restart after a possible crash.

In some implementations of a data storage application 604, the page management module of the persistence layer 612 may implement a shadow paging. The free block manager 722 within the page management module 720 may maintain the status of physical pages. The page buffer 704 may include a fixed page status buffer that operates as discussed herein. A converter component 740, which may be part of or in communication with the page management module 720, may be responsible for mapping between logical and physical pages written to the storage 614. The converter 740 may maintain the current mapping of logical pages to the corresponding physical pages in a converter table 742. The converter 740 may maintain a current mapping of logical pages 706 to the corresponding physical pages in one or more converter tables 742. When a logical page 706 is read from storage 614, the storage page to be loaded may be looked up from the one or more converter tables 742 using the converter 740. When a logical page is written to storage 614 the first time after a savepoint, a new free physical page is assigned to the logical page. The free block manager 722 marks the new physical page as "used" and the new mapping is stored in the one or more converter tables 742.

The persistence layer 612 may ensure that changes made in the data storage application 604 are durable and that the data storage application 604 may be restored to a most recent committed state after a restart. Writing data to the storage 614 need not be synchronized with the end of the writing transaction. As such, uncommitted changes may be written to disk and committed changes may not yet be written to disk when a writing transaction is finished. After a system crash, changes made by transactions that were not finished may be rolled back. Changes occurring by already committed transactions should not be lost in this process. A logger component 744 may also be included to store the changes made to the data of the data storage application in a linear log. The logger component 744 may be used during recovery to replay operations since a last savepoint to ensure that all operations are applied to the data and that transactions with a logged "commit" record are committed before rolling back still-open transactions at the end of a recovery process.

With some data storage applications, writing data to a disk is not necessarily synchronized with the end of the writing transaction. Situations may occur in which uncommitted changes are written to disk and while, at the same time, committed changes are not yet written to disk when the writing transaction is finished. After a system crash, changes made by transactions that were not finished must be rolled back and changes by committed transaction must not be lost.

To ensure that committed changes are not lost, redo log information may be written by the logger component 744 whenever a change is made. This information may be written to disk at latest when the transaction ends. The log entries may be persisted in separate log volumes while normal data is written to data volumes. With a redo log, committed changes may be restored even if the corresponding data pages were not written to disk. For undoing uncommitted changes, the persistence layer 612 may use a combination of undo log entries (from one or more logs) and shadow paging.

The persistence interface 702 may handle read and write requests of stores (e.g., in-memory stores, etc.). The persistence interface 702 may also provide write methods for writing data both with logging and without logging. If the logged write operations are used, the persistence interface 702 invokes the logger 744. In addition, the logger 744 provides an interface that allows stores (e.g., in-memory stores, etc.) to directly add log entries into a log queue. The logger interface also provides methods to request that log entries in the in-memory log queue are flushed to disk.

Log entries contain a log sequence number, the type of the log entry and the identifier of the transaction. Depending on the operation type additional information is logged by the logger 744. For an entry of type "update", for example, this would be the identification of the affected record and the after image of the modified data.

When the data application 604 is restarted, the log entries need to be processed. To speed up this process the redo log is not always processed from the beginning. Instead, as stated above, savepoints may be periodically performed that write all changes to disk that were made (e.g., in memory, etc.) since the last savepoint. When starting up the system, only the logs created after the last savepoint need to be processed. After the next backup operation the old log entries before the savepoint position may be removed.

When the logger 744 is invoked for writing log entries, it does not immediately write to disk. Instead it may put the log entries into a log queue in memory. The entries in the log queue may be written to disk at the latest when the corresponding transaction is finished (committed or aborted). To guarantee that the committed changes are not lost, the commit operation is not successfully finished before the corresponding log entries are flushed to disk. Writing log queue entries to disk may also be triggered by other events, for example when log queue pages are full or when a savepoint is performed.

With the current subject matter, the logger 744 may write a database log (or simply referred to herein as a "log") sequentially into a memory buffer in natural order (e.g., sequential order, etc.). If several physical hard disks/storage devices are used to store log data, several log partitions may be defined. Thereafter, the logger 744 (which as stated above acts to generate and organize log data) may load-balance writing to log buffers over all available log partitions. In some cases, the load-balancing is according to a round-robin distributions scheme in which various writing operations are directed to log buffers in a sequential and continuous manner. With this arrangement, log buffers written to a single log segment of a particular partition of a multi-partition log are not consecutive. However, the log buffers may be reordered from log segments of all partitions during recovery to the proper order.

As stated above, the data storage application 604 may use shadow paging so that the savepoint manager 716 may write a transactionally-consistent savepoint. With such an arrangement, a data backup comprises a copy of all data pages contained in a particular savepoint, which was done as the first step of the data backup process. The current subject matter may be also applied to other types of data page storage.

Figure 8:
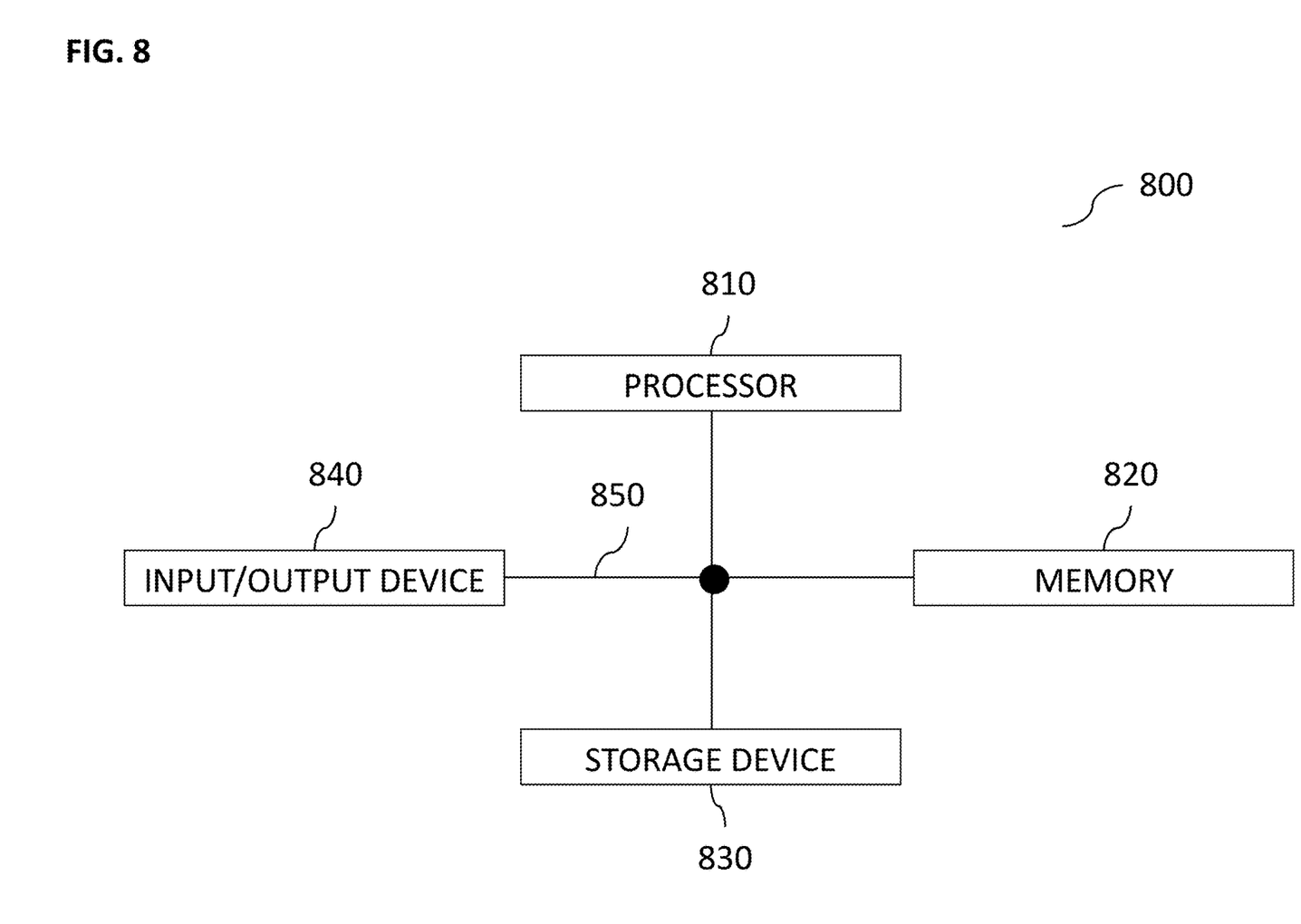
FIG. 8 is an exemplary system, according to some implementations of the current subject matter.

In some implementations, the current subject matter may be configured to be implemented in a system 800, as shown in FIG. 8. The system 800 may include a processor 810, a memory 820, a storage device 830, and an input/output device 840. Each of the components 810, 820, 830 and 840 may be interconnected using a system bus 850. The processor 810 may be configured to process instructions for execution within the system 800. In some implementations, the processor 810 may be a single-threaded processor. In alternate implementations, the processor 810 may be a multi-threaded processor. The processor 810 may be further configured to process instructions stored in the memory 820 or on the storage device 830, including receiving or sending information through the input/output device 840. The memory 820 may store information within the system 800. In some implementations, the memory 820 may be a computer-readable medium. In alternate implementations, the memory 820 may be a volatile memory unit. In yet some implementations, the memory 820 may be a non-volatile memory unit. The storage device 830 may be capable of providing mass storage for the system 800. In some implementations, the storage device 830 may be a computer-readable medium. In alternate implementations, the storage device 830 may be a floppy disk device, a hard disk device, an optical disk device, a tape device, non-volatile solid state memory, or any other type of storage device. The input/output device 840 may be configured to provide input/output operations for the system 800. In some implementations, the input/output device 840 may include a keyboard and/or pointing device. In alternate implementations, the input/output device 840 may include a display unit for displaying graphical user interfaces.

Figure 9:
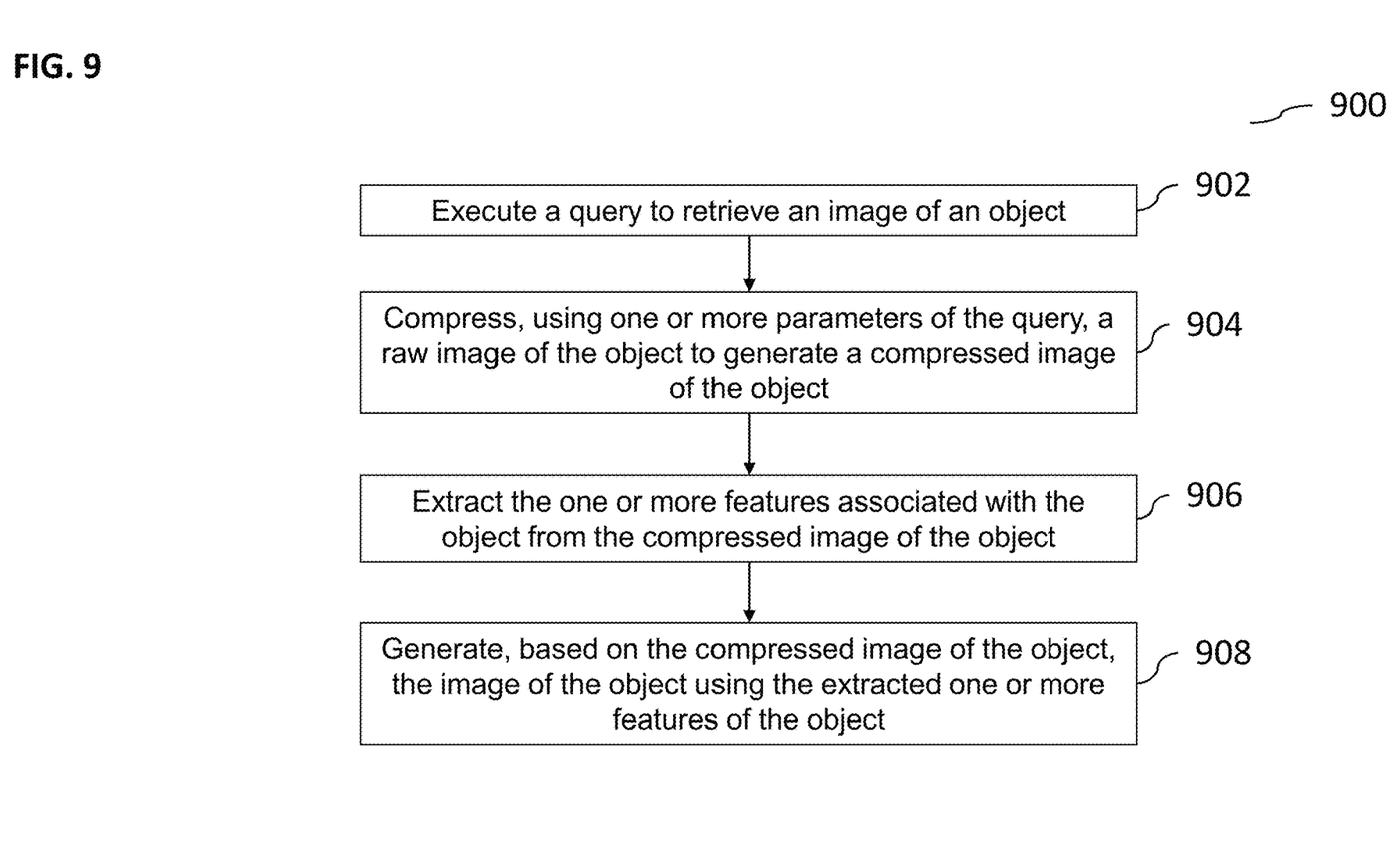
FIG. 9 is an exemplary method, according to some implementations of the current subject matter.

FIG. 9 illustrates an exemplary method 900 for performing on-demand feature extraction from a raw image of an object for analysis, according to some implementations of the current subject matter. At 902, a query to retrieve an image of an object may be executed. The query may include various parameters (e.g., SELECT, INSERT, etc.) and can be directed to obtaining information about a particular geographical location to a particular time range (e.g., wildfire, flood, etc. risk). At 904, using one or more parameters of the query, a raw image of the object may be compressed to generate a compressed image of the object (using for example, an encoder shown in FIG. 5). At 906, one or more features associated with the object may be extracted from the compressed image of the object (as discussed above in connection with FIG. 4). At 908, the image of the object may be generated using the extracted features of the object based on the compressed image of the object (e.g., database(db)-consumable data types may be extracted accordingly).

In some implementations, the current subject matter may include one or more of the following optional features. The query may specify at least one of: a geographical location of the object and a time period during which an image of the object was obtained (as discussed above, features/index description, e.g., risk of wildfires, etc., may be specified/determined).

In some implementations, the method may further include combining the generated image of the object with an additional data associated with the object, and generating a combined representation of the object including the generated image of the object and the additional data. The compressing may include encoding the raw image to generate one or more encoded values corresponding to the one or more features of the object, decoding the encoded raw image to generate one or more indexes, and generating, using the one or more indexes, one or more polygons to represent a boundary of the object. In some implementations, object's image generation may include reconstructing the image of the object using the one or more generated polygons.

In some implementations, the method may also include storing the indexes in an index table in a database system. The method may also include receiving another raw image of the object, and updating the index table based on the received another raw image.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A computer-implemented method, comprising:
   executing a query at a database system to retrieve an image of an object, the query comprising a geographical location of the object and a time period during which the image of the object was obtained;
   determining, from at least the geographical location of the object and the time period, metadata identifying a raw image in a raw image store separate from the database system;
   compressing the raw image of the object to generate a compressed image of the object, the compressing comprising:
   blurring the raw image identified by the metadata to enable contour extraction,
   encoding, using an autoencoder machine learning model, the blurred raw image,
   wherein the encoding, using the autoencoder machine learning model, generates one or more encoded values corresponding to one or more features of the object,
   decoding the encoded blurred raw image to generate one or more indexes to train the autoencoder machine learning model, and
   generating, using the one or more indexes, one or more polygons to represent a boundary of the object, the one or more indexes stored in an index table in the database system;
   extracting one or more contours of the one or more features of the object from the encoded blurred raw image of the object, the one or more contours being determined using the autoencoder machine learning model for each of the one or more features;
   generating, using the autoencoder machine learning model, one or more scores for each of the one or more features of the object;
   generating, using the one or more extracted contours, one or more vector data representing the one or more features of the object;
   generating, based on the compressed raw image of the objects, the one or more extracted contours, and the one or more scores, the image of the object using the one or more vector data representing the one or more features of the object; and
   returning the generated image of the object.

2. The computer-implemented method according to claim 1, further comprising:
   combining the generated image of the object with an additional data associated with the object; and
   generating a combined representation of the object comprising the generated image of the object and the additional data.

3. The computer-implemented method according to claim 1 wherein the generating the image of the object further comprises reconstructing the image of the object using the one or more indexes.

4. The computer-implemented method according to claim 1, further comprising:
   receiving another raw image of the object; and
   updating the index table based on the received another raw image.

5. A system comprising:
   at least one programmable processor; and
   a non-transitory machine-readable medium storing instructions that, when executed by the at least one programmable processor, cause the at least one programmable processor to perform operations comprising:
   executing a query at a database system to retrieve an image of an object, the query comprising a geographical location of the object and a time period during which the image of the object was obtained;
   determining, from at least the geographical location of the object and the time period, metadata identifying a raw image in a raw image store separate from the database system;
   compressing the raw image of the object to generate a compressed image of the object, the compressing comprising:

blurring the raw image identified by the metadata to enable contour extraction, encoding, using an autoencoder machine learning model, the blurred raw image, wherein the encoding, using the autoencoder machine learning model, generates one or more encoded values corresponding to one or more features of the object, decoding the encoded blurred raw image to generate one or more indexes to train the autoencoder machine learning model, and generating, using the one or more indexes, one or more polygons to represent a boundary of the object, the one or more indexes stored in an index table in the database system;

extracting one or more contours of the one or more features of the object from the encoded blurred raw image of the object, the one or more contours being determined using the autoencoder machine learning model for each of the one or more features;

generating, using the autoencoder machine learning model, one or more scores for each of the one or more features of the object;

generating, using the one or more extracted contours, one or more vector data representing the one or more features of the object;

generating, based on the compressed raw image of the object the one or more extracted contours, and the one or more scores, the image of the object using the one or more vector data representing the one or more features of the object; and returning the generated image of the object.

6. The system according to claim 5, wherein the operations further comprise;

combining the generated image of the object with an additional data associated with the object; and generating a combined representation of the object comprising the generated image of the object and the additional data.

7. The system according to claim 5, wherein the generating the image of the object further comprises reconstructing the image of the object using the one or more generated indexes.

8. The system according to claim 5, wherein the operations further comprise:

receiving another raw image of the object; and updating the index table based on the received another raw image.

9. A computer program product comprising a non-transitory machine-readable medium storing instructions that, when executed by at least one programmable processor, cause the at least one programmable processor to perform operations comprising:

executing a query at a database system to retrieve an image of an object, the query comprising a geographical location of the object and a time period during which the image of the object was obtained;

determining, from at least the geographical location of the object and the time period, metadata identifying a raw image in a raw image store separate from the database system;

compressing the raw image of the object to generate a compressed image of the object, the compressing comprising:

blurring the raw image identified by the metadata to enable contour extraction, encoding, using an autoencoder machine learning model, the blurred raw image, wherein the encoding, using the autoencoder machine learning model, generates one or more encoded values corresponding to one or more features of the object, decoding the encoded blurred raw image to generate one or more indexes to train the autoencoder machine learning model, and generating, using the one or more indexes, one or more polygons to represent a boundary of the object, the one or more indexes stored in an index table in the database system; extracting one or more contours of the one or more features of the object from the encoded blurred raw image of the object, the one or more contours being determined using the autoencoder machine learning model for each of the one or more features;

generating, using the autoencoder machine learning model, one or more scores for each of the one or more features of the object;

generating, using the one or more extracted contours, one or more vector data representing the one or more features of the object;

generating, based on the compressed raw image of the object, the one or more extracted contours, and the one or more scores, the image of the object using the one or more vector data representing the one or more features of the object; and returning the generated image of the object.

10. The computer program product according to claim 9, wherein the operations further comprise:

combining the generated image of the object with an additional data associated with the object; and generating a combined representation of the object comprising the generated image of the object and the additional data.

11. The computer program product according to claim 9, wherein the generating the image of the object further comprises reconstructing the image of the object using the one or more generated indexes.

* * * * *